United States Patent
Park et al.

(10) Patent No.: US 9,369,992 B1
(45) Date of Patent: Jun. 14, 2016

(54) SUB-BAND SELECTION FOR CARRIER AGGREGATION

(71) Applicant: Sprint Spectrum LP, Overland Park, KS (US)

(72) Inventors: Sungki Park, Ashburn, VA (US); Saied Kazeminejad, Ashburn, VA (US); Brett Christian, Independence, MO (US); Brent Scott, Drexel, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 679 days.

(21) Appl. No.: 13/679,950

(22) Filed: Nov. 16, 2012

(51) Int. Cl.
*H04W 72/08* (2009.01)
*H04W 72/04* (2009.01)

(52) U.S. Cl.
CPC ..................................... *H04W 72/04* (2013.01)

(58) Field of Classification Search
CPC ... H04W 72/082; H04W 72/12; H04L 1/0027
See application file for complete search history.

(56) References Cited

U.S. PATENT DOCUMENTS

| | | | |
|---|---|---|---|
| 2010/0027502 A1* | 2/2010 | Chen et al. | 370/330 |
| 2010/0048151 A1* | 2/2010 | Hara | 455/115.1 |
| 2011/0028148 A1 | 2/2011 | Lee et al. | |
| 2011/0261676 A1 | 10/2011 | Zhou et al. | |
| 2011/0268045 A1 | 11/2011 | Heo et al. | |
| 2012/0182948 A1* | 7/2012 | Huang et al. | 370/329 |
| 2013/0194938 A1* | 8/2013 | Immonen et al. | 370/329 |

* cited by examiner

*Primary Examiner* — Jeffrey M Rutkowski
*Assistant Examiner* — Thomas D Busch

(57) ABSTRACT

In systems and methods of selecting a sub-band, a first sub-band and a second sub-band of an access node are selected, and is it determined that an intermodulation product of the first sub-band and the second sub-band overlaps with a carrier band of the access node. A transmission of data is scheduled on the second sub-band when a power of the intermodulation product of the first sub-band and the second sub-band does not meet a power threshold.

15 Claims, 6 Drawing Sheets

SUB-BAND SELECTION FOR CARRIER AGGREGATION

TECHNICAL BACKGROUND

One method of increasing a data rate over a wireless communication link involves increasing a transmission bandwidth of the communication link. To increase such bandwidth beyond that which can be supported by a single carrier or channel, more than one carrier can be used, sometimes termed carrier aggregation. Carrier aggregation can allow the expansion of effective bandwidth of a communication link through concurrent utilization of radio resources across multiple carriers or channels to form a larger overall transmission bandwidth. The interaction of carriers selected for carrier aggregation may produce intermodulation distortion which can negatively affect data transmission, especially when intermodulation products overlap with a data channel or data carrier.

Overview

In an embodiment, a first sub-band and a second sub-band of an access node are selected. It is determined that an intermodulation product of the first sub-band and the second sub-band overlaps with a carrier band of the access node. When a power of the intermodulation product of the first sub-band and the second sub-band does not meet a power threshold, a transmission of data is scheduled on the second sub-band.

DETAILED DESCRIPTION

In an embodiment, a first sub-band and a second sub-band of an access node are selected, and it is determined that an intermodulation product of the first sub-band and the second sub-band overlaps with a carrier band of the access node. When a power of the intermodulation product of the first sub-band and the second sub-band does not meet a power threshold, a transmission of data on the second sub-band is scheduled. In an embodiment, when the power of the intermodulation product meets the power threshold, the second sub-band can be allocated to a different sector of the access node.

Figure 1:
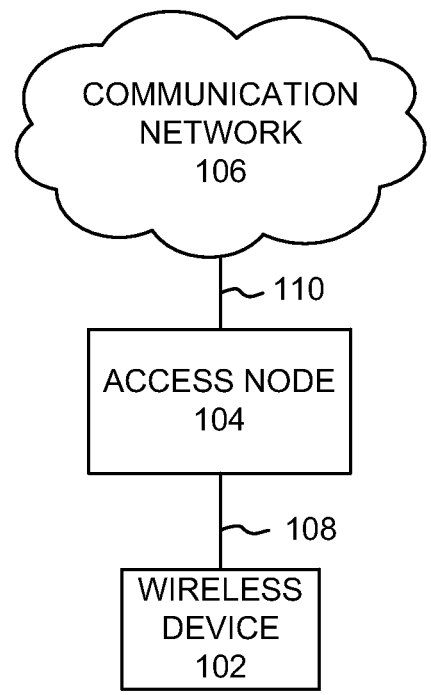
FIG. 1 illustrates an exemplary communication system for selecting a sub-band.

FIG. 1 illustrates an exemplary communication system 100 for selecting a sub-band comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications over a plurality of carrier bands and/or a plurality of sub-bands to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Figure 2A:
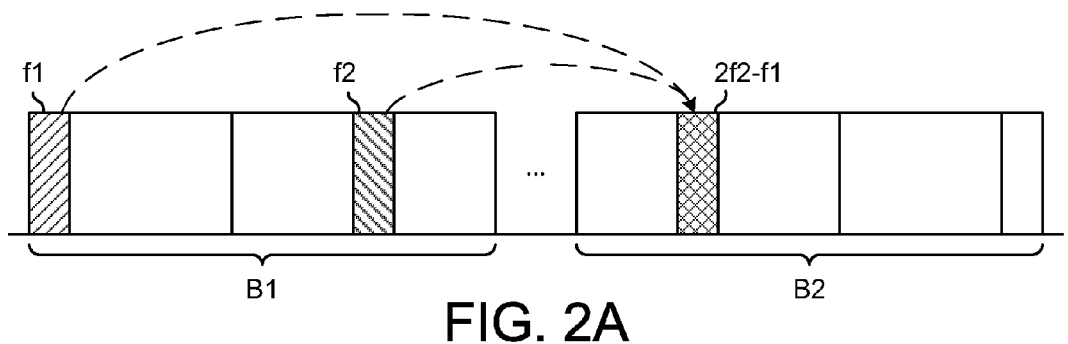
FIGS. 2A and 2B illustrates exemplary sub-bands and an intermodulation product.
Figure 2B:
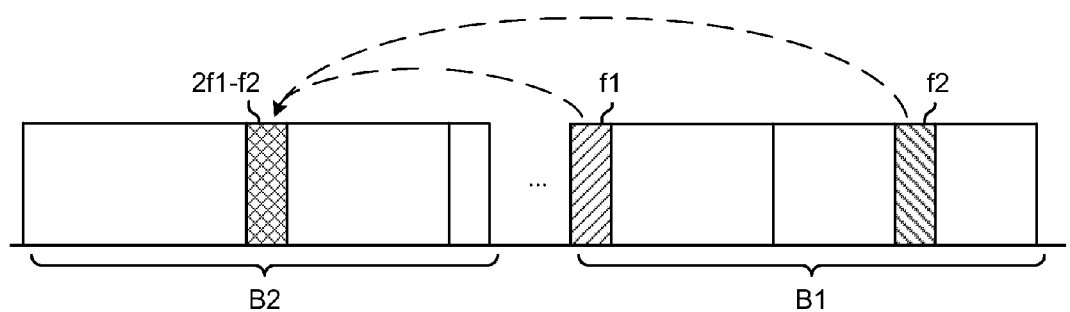

To increase the bandwidth of a wireless communication link beyond a single carrier or channel, concurrent utilization of radio resources across multiple carriers or channels can be used to form a larger overall transmission bandwidth. Bandwidth allocated to a wireless communication system can be divided into carrier bands or frequency bands. Carrier aggregation permits the use of multiple carriers to increase communication bandwidth. In addition, portions of a carrier band, sometimes termed sub-bands, may be aggregated, which can be referred to as sub-band aggregation. FIGS. 2A and 2B illustrate two sub-bands f1 and f2 of a carrier band B1. While f1 and f2 are illustrated for simplicity as components of the same carrier band B1, f1 and f2 may also be components of different carrier bands.

The interaction of two frequencies can produce additional signals or intermodulation products, typically at higher frequencies than the two interacting frequencies, and which can have amplitudes which are a multiple of the amplitude of the interacting frequencies. Higher order intermodulation products, such as third order or fifth order intermodulation products, can have an amplitude proportional to a multiple of the interacting frequencies, and thus are of particular concern. For example, f1 and f2 can interact to produce a third order intermodulation product, for example $2f1$-$f2$, or $2f2$-$f1$. When the intermodulation product overlaps with a carrier band, such as carrier band B2, resulting intermodulation distortion can interfere with data transmission.

Figure 2C:
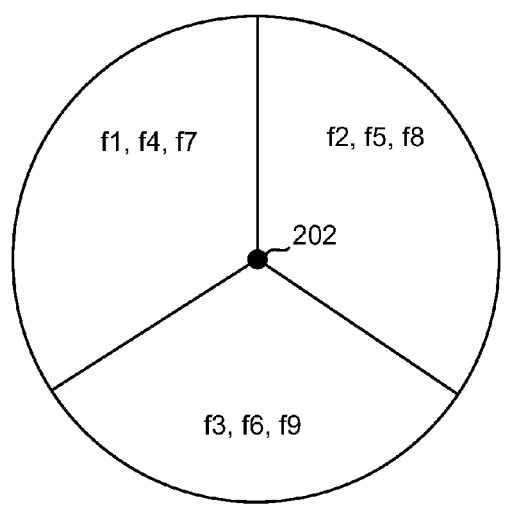
FIG. 2C illustrates exemplary sectors of an access node.

In an embodiment, a first sub-band and a second sub-band of access node 104 are selected. It is determined that an intermodulation product of the first sub-band and the second sub-band overlaps with a carrier band of access node 104. When a power of the intermodulation product of the first sub-band and the second sub-band does not meet a power threshold, a transmission of data on the second sub-band is scheduled. In an embodiment, when the power of the intermodulation product meets the power threshold, the second sub-band can be allocated to a different sector of access node 104. For example, FIG. 2C illustrates an access node 202 with sub-bands allocated to different sectors of the access node. Sub-bands f1, f4 and f7 are allocated to a first sector, sub-bands f2, f5 and 18 are allocated to a second sector, and sub-bands f3, f6 and f9 are allocated to a third sector. In embodiments, the intermodulation product can be a third order intermodulation product or a fifth order intermodulation product. In embodiments, the transmission of data can be scheduled from the access node to a wireless device, or from the wireless device to an access node.

Figure 3:
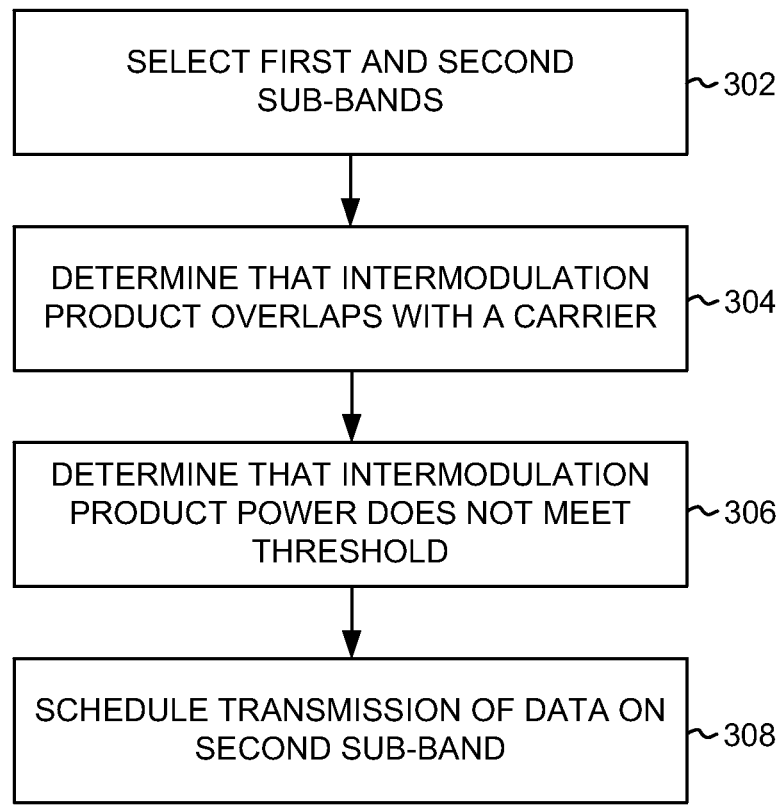
FIG. 3 illustrates an exemplary method of selecting a sub-band.

FIG. 3 illustrates an exemplary method of selecting a sub-band. In operation 302, a first sub-band and a second sub-band are selected from a carrier band of an access node. For example, sub-bands f1 and f2 can be selected from a carrier band of access node 104. Sub-bands can be selected from the same carrier band, or from different carrier bands of the access node.

In operation 304, it is determined that an intermodulation product overlaps with a carrier band of the access node. For example, it can be determined that a third order intermodulation product $2f1$-$f2$ (or $2f2$-$f1$) of the interaction of selected sub-bands f1 and f2 overlaps with carrier band B2. However, unless a power level of the intermodulation product meets a power threshold, the power level of the intermodulation product will likely be insufficient to cause significant intermodulation distortion. In operation 306, it is determined that a power level of the intermodulation product does not meet a power threshold.

When the power of the intermodulation product of the first sub-band and the second sub-band does not meet the power threshold, a transmission of data from the access node (or to the access node) is scheduled on the second sub-band. A transmission of data from the access node (or to the access node) can also be scheduled on the first sub-band; in fact, the first sub-band can be used to schedule data transmission regardless of whether the power level of the intermodulation product meets the power threshold.

In an embodiment, it can be determined that an intermodulation product overlaps with a carrier band in a sector of an access node, such as, for example, a sector as illustrated in FIG. 2B. Sub-bands can be selected for a first sector of an access node, and further, where resultant intermodulation distortion meets a power threshold, one of the selected sub-bands can be allocated to a second sector of the access node. For example, sub-bands f1 and f2 can be selected for a first sector of access node 202, and a transmission of data can be prevented on the second sub-band in the first sector of access node 202 when the intermodulation distortion meets the power threshold. Further, a transmission of data can be scheduled on the second sub-band in a second sector of access node 202.

In an embodiment, it can be determined that an intermodulation product power meets a power threshold. That is, it can be determined that an intermodulation product of selected sub-bands is within a carrier of the access node, and that an intermodulation product power meets a power threshold. In such case, a transmission of data can be prevented on one of the sub-bands. For example, it can be determined that an intermodulation product of the first sub-band and a third sub-band (which is different from the second sub-band) is within a carrier of the access node, and a transmission of data on the third sub-band can be prevented when a power of the intermodulation product meets the power threshold. These determinations can also be made in a sector of an access node. Thus, a transmission of data can be prevented in a first sector of an access node on the third sub-band from when the power of the intermodulation product meets the power threshold. In addition, a transmission of data can be scheduled in a second sector of an access node on the third sub-band from when the power of the intermodulation product meets the power threshold.

Figure 4:
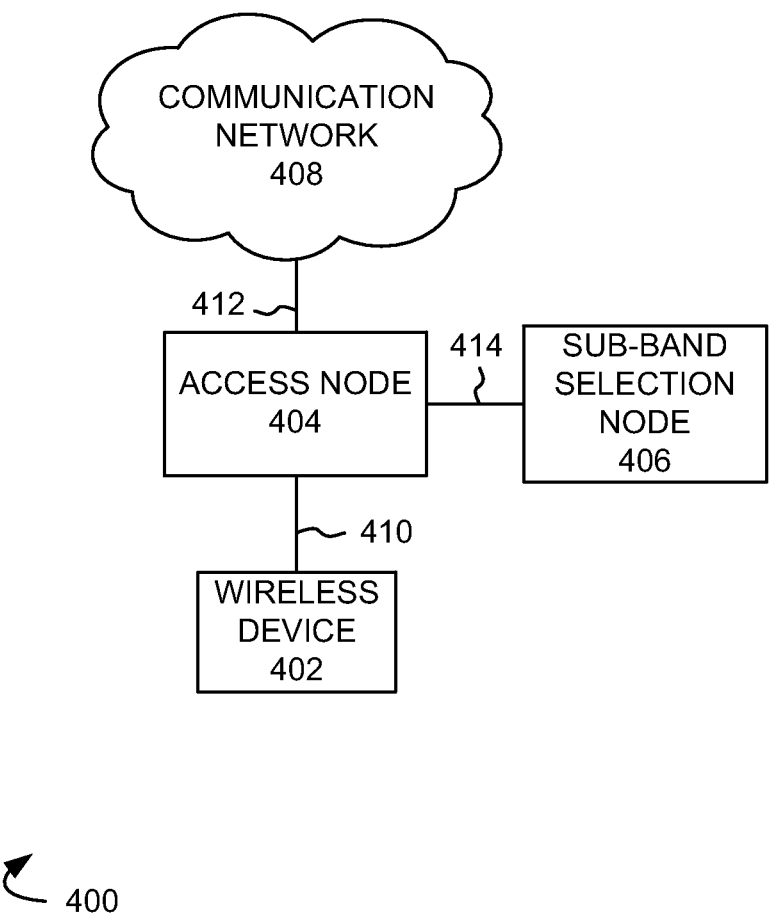
FIG. 4 illustrates another exemplary communication system for selecting a sub-band.

FIG. 4 illustrates another exemplary communication system 400 for selecting a sub-band comprising wireless device 402, access node 404, sub-band selection node 406, and communication network 408. Examples of wireless device 402 can include a cell phone, a smart phone, a computing platform such as a laptop, palmtop, or tablet, a personal digital assistant, or an internet access device, including combinations thereof. Wireless device 402 is in communication with access node 404 over communication link 410.

Access node 404 is a network node capable of providing wireless communications over a plurality of carrier bands and/or a plurality of sub-bands to wireless device 402, and can be, for example, a base transceiver station, a radio base station, an eNodeB device, or an enhanced eNodeB device. Access node 404 is in communication with communication network 408 over communication link 110 and with sub-band selection node 406 over communication link 414.

Sub-band selection node 406 can comprise a processor and associated circuitry to execute or direct the execution of computer-readable instructions select a sub-band. Sub-band selection node 406 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Sub-band selection node 410 can be for example, a standalone computing device or network element, or the functionality of sub-band selection node 410 can be included in another network element, such as access node 404, a mobility management entity (MME), a gateway, a proxy node, or another network element.

Communication network 408 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 408 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 408 may also comprise a wireless network, including base stations, wireless communication nodes, telephony switches, internet routers, network gateways, computer systems, communication links, or some other type of communication equipment, and combinations thereof.

Communication links 410, 412 and 414 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, sub-band selection node 406 and communication network 408 which are omitted for clarity, including additional processing nodes, routers, gateways, and physical and/or wireless data links for carrying data among the various network elements.

Figure 5:
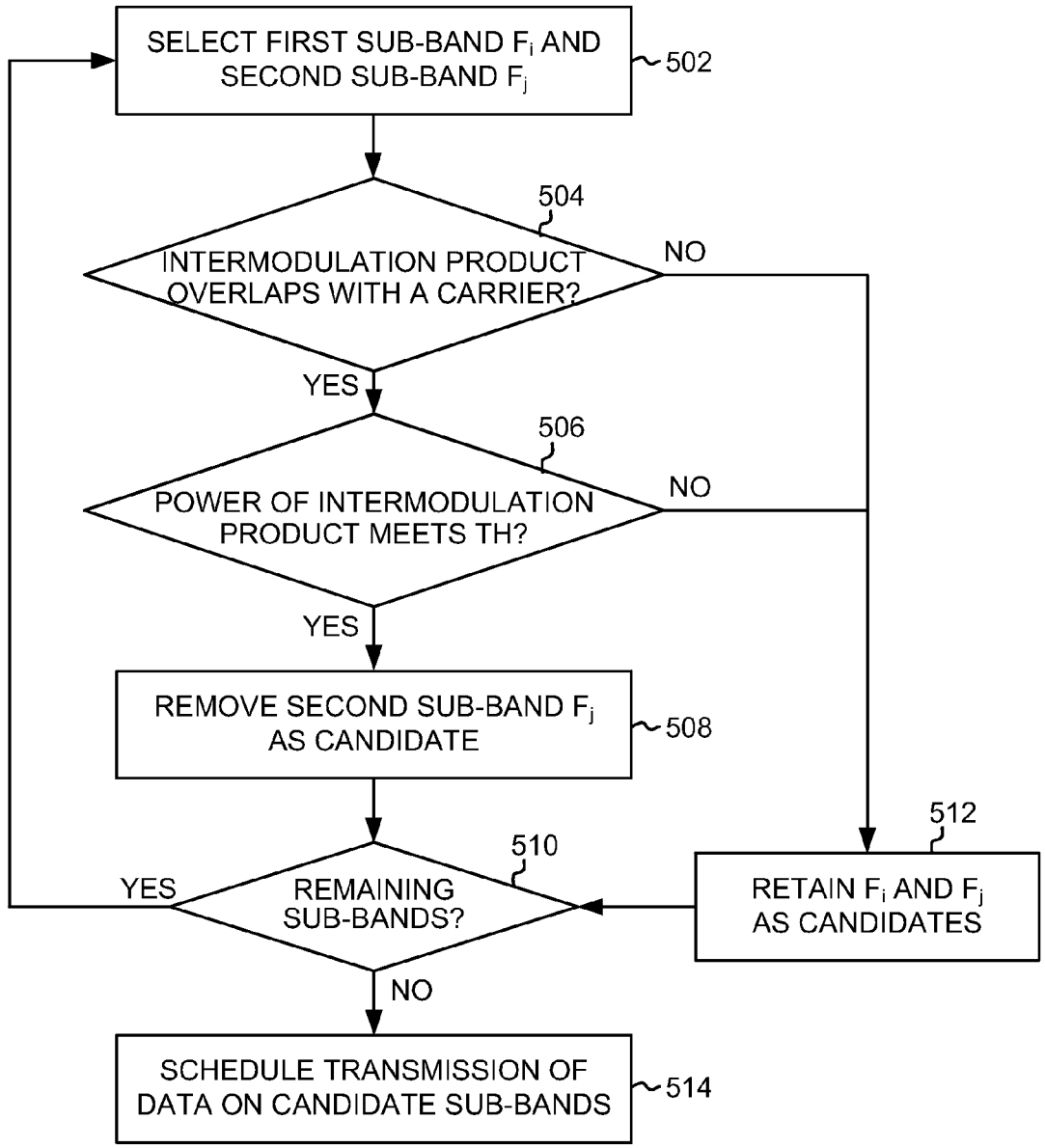
FIG. 5 illustrates another exemplary method of selecting a sub-band.

FIG. 5 illustrates another exemplary method of selecting a sub-band. In operation 502, a first sub-band and a second sub-band are selected from among a plurality of candidate sub-bands. The candidate sub-bands are selected from a carrier band or from carrier bands of an access node. For example, access node 404 can comprise a plurality of carrier bands, and the carrier bands can comprise one or more sub-bands. A first sub-band $F_i$ and a second sub-band $F_j$ can be selected from the one or more carrier bands. The first and second sub-bands can be selected from the same carrier band, or from different carrier bands.

In operation 504, it is determined whether an intermodulation product overlaps with a carrier band of the access node. In an embodiment, an intermodulation product is calculated based on the first sub-band $F_i$ and the second sub-band $F_j$. An intermodulation product overlaps with a carrier band when at least a portion of the intermodulation product overlaps with at least a portion of the carrier band. When the intermodulation product does not overlap with a carrier band (operation 504-NO) then the first sub-band $F_i$ and the second sub-band $F_j$ are retained as candidate sub-bands. Candidate sub-bands can be used to schedule a data transmission, as further described below.

When the intermodulation product overlaps with a carrier band (operation 504-YES), then it is determined whether a power of the intermodulation product meets a power threshold (operation 506). When a power level of the intermodulation product meets a power threshold, the power level of the intermodulation product can produce intermodulation distortion which can interfere with signal transmission. Thus, when a power level of the intermodulation product meets the power threshold (operation 508-YES), the second sub-band $F_j$ is removed as a candidate sub-band and will not be used to schedule a data transmission. On the other hand, when a power level of the intermodulation product does not meet the power threshold, the second sub-band $F_j$ (as well as the first sub-band $F_i$) are retained as candidate sub-bands.

When any other sub-bands remain to be considered (operation 510-YES), a new second sub-band $F_j$ is selected, and an intermodulation product of $F_i$ and $F_j$ is calculated. When no sub-bands remain to be considered (operation 510-NO), a transmission of data can be scheduled on the candidate sub-bands (operation 514). That is, the remaining sub-bands (i.e., those sub-bands of the access node that were not removed as candidate sub-bands) can be used in the scheduling of a data transmission from an access node. In embodiments, the transmission of data can be scheduled from the access node to a wireless device, or from a wireless device to the access node.

In an embodiment, sub-bands $F_i$ and $F_j$ can be selected from among sub-bands in a first sector of an access node. That is, sub-bands $F_i$ and $F_j$ can be selected in a first sector of an access node, and where a resultant intermodulation distortion meets a power threshold, one of the selected sub-bands can be removed from the plurality of candidate sub-bands for the first sector of the access node. In addition, the removed sub-band can be allocated to a second sector of the access node. When the removed sub-band and another sub-band in the second sector of the access node produce an intermodulation product that does not overlap with a carrier band in the second sector of the access node, or which overlaps with a carrier band of the second sector but which has a power that does not meet a power threshold, then the removed sub-band can be retained as a candidate sub-band for the second sector of the access node.

Figure 6:
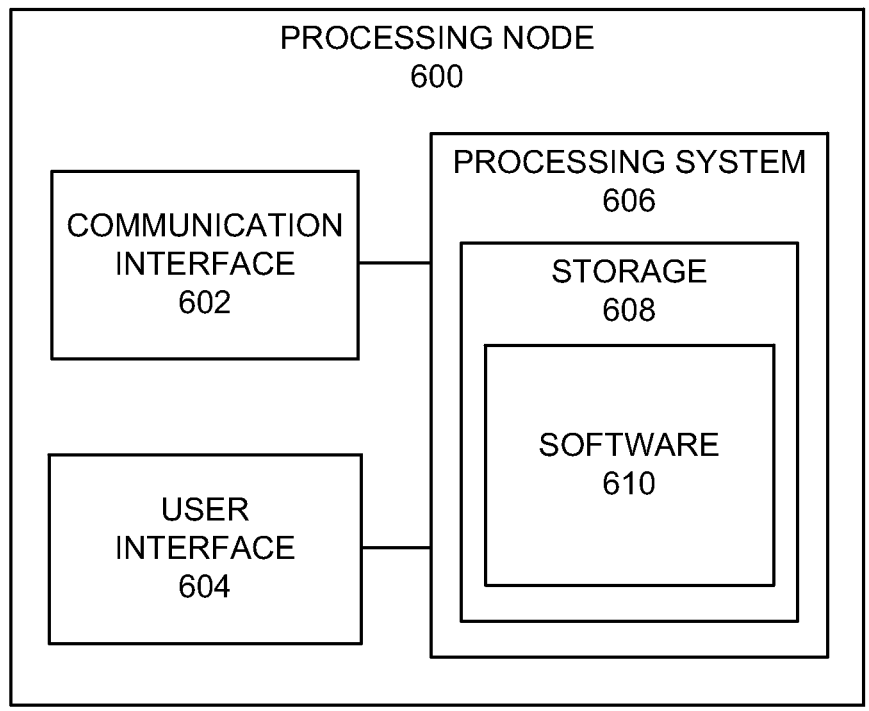
FIG. 6 illustrates an exemplary processing node.

FIG. 6 illustrates an exemplary processing node 600 comprising communication interface 602, user interface 604, and processing system 606 in communication with communication interface 602 and user interface 604. Processing node 600 is capable of selecting a sub-band. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include sub-band selection node 406. Processing node 600 can also be an adjunct or component of a network element, such as an element of access node 104 or access node 404, a mobility management entity, a gateway, a proxy node, or another network element in a communication system. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting a sub-band, comprising:
   selecting a first sub-band and a plurality of second sub-bands from among candidate sub-bands of an access node, the first sub-band and the plurality of second sub-bands being selected in a first sector of the access node from a same carrier band;
   calculating intermodulation products of the first sub-band and each of the selected second sub-bands;
   removing at least one of the selected second sub-bands from the candidate sub-bands when the intermodulation product of the first sub-band and the selected second sub-bands overlap with at least a portion of the carrier band of the access node and a power of the intermodulation product meets a power threshold;
   scheduling and transmitting a first transmission of data on the removed second sub-band in a second sector of the access node when the power of the intermodulation product of the first sub-band and the selected second sub-bands does not meet the power threshold.

2. The method of claim 1, wherein scheduling the first transmission of data further comprises:
   scheduling and transmitting a transmission of data on the first sub-band and the second sub-band when the power of the intermodulation product of the first sub-band and the second sub-band does not meet the power threshold.

3. The method of claim 1, wherein
   a transmission of data is further scheduled and transmitted on the second sub-band in the first sector of the access node when the intermodulation distortion does not meet the power threshold.

4. The method of claim 3, wherein scheduling the further transmission of data further comprises:
   preventing the transmission of data on the second sub-band in the first sector of the access node when the intermodulation distortion meets the power threshold; and
   scheduling and transmitting the transmission of data on the second sub-band in the second sector of the access node.

5. The method of claim 1, further comprising:
   selecting a third sub-band carrier of a second carrier band;
   determining that an intermodulation product of the first sub-band and the third sub-band is within a carrier band of the access node; and
   preventing a transmission of data on the third sub-band when the power of the intermodulation product meets the power threshold.

6. The method of claim 5, further comprising:
   preventing transmission of data in the first sector of the access node on the third sub-band from when the power of the intermodulation product meets the power threshold.

7. The method of claim 5, further comprising:
   scheduling and transmitting the transmission of data in the second sector of the access node on the third sub-band when the power of the intermodulation product meets the power threshold.

8. A system for selecting a sub-band, comprising:
   a processing node comprising a processor and a transmitter, configured to:
      select a first sub-band and a plurality of second sub-bands from among candidate sub-bands of an access node, the first sub-band and the plurality of second sub-bands being selected in a first sector of the access node from a same carrier band;
      calculate intermodulation products of the first sub-band and each of the selected second sub-bands;
      remove at least one of the selected second sub-bands from the candidate sub-bands when the intermodulation product of the first sub-band and the selected second sub-bands overlap with at least a portion of the carrier band of the access node and a power of the intermodulation product meets a power threshold;
      schedule and transmit a first transmission of data on the removed second sub-band in a second sector of the access node when the power of the intermodulation product of the first sub-band and the selected second sub-bands does not meet the power threshold.

9. The system of claim 8, wherein the processing node is further configured to:
   schedule and transmit a transmission of data on the first sub-band and the second sub-band when the power of the intermodulation product of the first sub-band and the second sub-band does not meet the power threshold.

10. The system of claim 8, wherein the processing node is further configured to:
    schedule and transmit a further transmission of data on the second sub-band in the first sector of the access node when the intermodulation distortion does not meet the power threshold.

11. The system of claim 10, wherein the processing node is further configured to:
    prevent the further transmission of data on the second sub-band in the first sector of the access node when the intermodulation distortion meets the power threshold; and
    schedule and transmit the further transmission of data on the second sub-band in the second sector of the access node.

12. The system of claim 8, wherein the processing node is further configured to:
  select a third sub-band carrier of a second carrier band;
  determine that an intermodulation product of the first sub-band and the third sub-band is within a carrier band of the access node; and
  prevent a transmission of data on the third sub-band when the power of the intermodulation product meets the power threshold.

13. The system of claim 12, wherein the processing node is further configured to:
  prevent the further transmission of data in the first sector of the access node on the third sub-band from when the power of the intermodulation product meets the power threshold; and
  schedule and transmit the further transmission of data in the second sector of the access node on the third sub-band from when the power of the intermodulation product meets the power threshold.

14. A method of selecting a sub-band, comprising:
  selecting a first sub-band and a second sub-band from among a plurality of candidate sub-bands in a first sector of an access node, wherein the first sub-band is a sub-band of a first carrier band and the second sub-band is a sub-band of a second carrier band;
  calculating intermodulation products of the selected first sub-band and the selected second sub-band;
  scheduling and transmitting a first transmission of data on the unselected candidate sub-bands in the first sector of the access node;
  determining that an intermodulation product of the first sub-band and the second sub-band overlaps at least a portion of either the first or second carrier band of the access node and, based on the determination that a power of the intermodulation product meets a power threshold, removing the selected second sub-band; and
  scheduling and transmitting a second transmission of data on the removed second sub-band in a second sector of the access node when the power of the intermodulation product of the first sub-band and the selected second sub-band does not meet the power threshold.

15. The method of claim 14, wherein scheduling the second transmission of data further comprises:
  scheduling and transmitting a transmission of data on the first sub-band and the second sub-band when the power of the intermodulation product of the first sub-band and the second sub-band does not meet the power threshold.

* * * * *